US006280801B1

(12) United States Patent
Schmitt

(10) Patent No.: US 6,280,801 B1
(45) Date of Patent: Aug. 28, 2001

(54) PROCESS AND DEVICE FOR CURING U/V PRINTING INKS

(75) Inventor: Peter Schmitt, Würzburg (DE)

(73) Assignee: Metronic Geratebau GmbH (DE)

( * ) Notice: Subject to any disclaimer, the term of this patent is extended or adjusted under 35 U.S.C. 154(b) by 0 days.

(21) Appl. No.: 08/945,614

(22) PCT Filed: Apr. 25, 1996

(86) PCT No.: PCT/DE96/00767

§ 371 Date: Oct. 27, 1997

§ 102(e) Date: Oct. 27, 1997

(87) PCT Pub. No.: WO96/33872

PCT Pub. Date: Oct. 31, 1996

(30) Foreign Application Priority Data

Apr. 27, 1995 (DE) ............................................ 195 15 462

(51) Int. Cl.[7] ................................ C08J 7/18; B05D 3/06

(52) U.S. Cl. ............................ 427/511; 427/493; 118/620

(58) Field of Search .................................... 427/511, 510, 427/514, 517, 495, 493; 118/50.1, 641, 620

(56) References Cited

U.S. PATENT DOCUMENTS

| | | | | |
|---|---|---|---|---|
| 3,713,864 | | 1/1973 | Ackerman et al. . | |
| 3,840,448 | | 10/1974 | Osborn et al. . | |
| 3,903,322 | * | 9/1975 | Rauve et al. | 427/519 |
| 3,930,064 | * | 12/1975 | Sander . | |
| 4,025,548 | * | 5/1977 | Huemmer et al. | 260/486 B |
| 4,047,071 | * | 9/1977 | Busch et al. | 313/490 |
| 4,125,678 | * | 11/1978 | Stvan et al. | 427/511 |
| 4,215,167 | | 7/1980 | Borden et al. . | |
| 4,266,053 | * | 5/1981 | Imanaka et al. | 544/196 |

(List continued on next page.)

FOREIGN PATENT DOCUMENTS

| | | |
|---|---|---|
| 1201374 | 4/1966 | (DE) . |
| 1771667 | 2/1972 | (DE) . |
| 3902643 | 12/1992 | (DE) . |
| 4301718 | 7/1994 | (DE) . |
| 0232545 | 8/1987 | (EP) . |
| 0517929 | 12/1992 | (EP) . |
| 0588534 | 3/1994 | (EP) . |
| 365541 | 10/1991 | (JP) . |

OTHER PUBLICATIONS

*UV Curing: Science and Technology,* ed. S. Peter Pappas; Tech. Marketing Corp., Stamford, Connecticut, USA, excerpt. p.78–115, 1978 no month.*

(List continued on next page.)

*Primary Examiner*—Marianne Padgett
(74) *Attorney, Agent, or Firm*—Chadbourne & Parke LLP

(57) ABSTRACT

The invention concerns a process and a device for curing a UV curing printing ink (14) on a printed material (9), wherein the printing ink (14) is irradiated with UV light from a UV radiation source (8). A low pressure gas discharge lamp (7) is proposed as UV radiation source (8). The device in accordance with the invention is characterized in that it comprises a stationary reflector (5) having, in particular, a special reflecting layer with diffuse reflecting material based on silicone rubber having diffuse reflecting particle imbedded therein.

33 Claims, 10 Drawing Sheets

U.S. PATENT DOCUMENTS

| | | | | |
|---|---|---|---|---|
| 4,309,452 | * | 1/1982 | Sachs . | |
| 4,411,931 | | 10/1983 | Duong . | |
| 4,551,215 | * | 11/1985 | Sakamoto et al. | 522/142 |
| 4,666,756 | * | 5/1987 | Sakata et al. | 427/511 |
| 4,933,123 | * | 6/1990 | Yoshida et al. | 264/446 |
| 4,959,178 | * | 9/1990 | Frentzel et al. | 427/520 |
| 5,623,023 | * | 4/1997 | Nishikubo | 525/327.3 |
| 5,840,788 | * | 11/1998 | Lutz et al. | 427/511 |
| 5,856,066 | * | 1/1999 | Yoshida et al. | 430/309 |
| 6,090,453 | * | 7/2000 | Narang et al. | 427/510 |

OTHER PUBLICATIONS

*Photopolymerization of Surface Coatings,* John Wiley & Sons, New York, C. G. Roffey excerpts p.41–66, 119–123, 137–139, 144–149, 1982 no month.*

Industrie–Lackier–Betrieb Mar. 1969, 85–91 in German–no translation ?by Doninger et al.

Kirk–Othmer, Encyclopedia of Technical Technology, vol. 1, no month 1991, pp. 322–323 $4^{th}$ edition, John Wiley & Sons, New York.

Ullmann's Encyclopedia of Industrial Chemisty, 5th Edition, no month 1991, vol. A18, p. 408 edition Elvers et al, VCH.

Abstract (English) of Japanese patent 84–303,796, published Oct. 26, 1984 to Nippon Oils & FATS KK.

* cited by examiner

PROCESS AND DEVICE FOR CURING U/V PRINTING INKS

BACKGROUND OF THE INVENTION

The invention concerns a process for curing a UV curable printing ink on a printed material, wherein the printing ink is irradiated with UV light from a UV radiation source. The invention also concerns an associated device for irradiating the printing ink with UV light.

UV curing printing inks contain low amounts of solvent or no solvent, cure when irradiated, and have recently become increasingly important. This is due to the high energy of UV radiation which is particularly advantageous in high speed printing of printed materials, in particular for flat bed printing and letter press printing. They also have practical advantages from a technical applications point of view compared to solvent-containing ink e.g. with regard to their working lifetime, solvent related environmental pollution, and waste disposal.

UV curing printing inks have a UV curable fixing agent system comprising a polymerizing fixing agent or mixture of fixing agents and one or more associated photo-initiators. The polymerization or cross-linking can be triggered by UV irradiation to cure the ink. One differentiates between radical-induced and cationic polymerization. Conventional radical-induced polymerizing fixing agents are based on acrylates, whereas the cationic polymerizing ones are characterized by acid release during UV irradiation. The invention concerns the general curing of UV curing printing inks independent of the particular fixing agent system.

Conventional applications for UV curing printing inks are e.g.: sheet-fed offset printing (e.g. packaging), continuous offset printing (e.g. direct mail advertising), dry offset printing (indirect letterpress printing, e.g. cups and tubes), label printing (letterpress and flexographic printing), flexographic printing (e.g. packaging) and silk screen printing (e.g. technical articles). UV curing, also often referred to as UV drying, has the advantage that the printing inks are solvent-free or of low solvent content and cure rapidly on the printed material under UV irradiation so that the printed material can be promptly further processed or packaged. The invention concerns curing of the printed ink and is therefore independent of the particular printing process used for introducing the printing ink onto the printed material.

Substantial technical requirements are required for the industrial radiation curing of printing ink. Prior art has required very high output power for the UV radiation sources in order to satisfy demands for ever increasing production speeds of 100 to 400 m/min and higher In multi-color printing, the separation between printing devices must be kept small to guarantee the precise matching of sequential colors without excessive complication and expense. The maximum separations in combination with the high printing speeds lead to extremely short times within which the ink must be sufficiently cured to prevent smearing during subsequent handling. Practical separations between printing devices assume values of circa 0.3 to 1.0 m corresponding to production times between printing stations of about 0.1 sec.

When one considers these stringent requirements it becomes clear that the UV intensity of the radiation source is very important. In order to achieve this, mercury vapor high pressure and medium pressure lamps have been nearly exclusively used as UV radiation sources in practical industrial applications up to this point in time. These lamps facilitate a particularly high UV intensity. DE-3902643 C2 and DE 4301718 A1 provide examples therefor.

The arc lengths of the conventional lamps vary between 10 cm and 220 cm and the specific electric power lies in the range between 30 to 250 watts per centimeter of arc length. The UV light power assumes values of approximately 20 watts per centimeter of arc length. Due to the need for U transparency, the tubular lamp material is quartz and the lamps are operated with a gas pressure of 1 to 2 atm. In certain cases, lasers, in particular excimer lasers, are also used to produce the UV radiation.

The above mentioned conventional UV radiation sources have the advantage of being able to produce a very high UV intensity on the surface of the printed material to effect very short curing times in the range of tenths of seconds. Excimer lasers have the disadvantage cf being complicated and expensive. For this reason, medium and high pressure gas discharge lamps are more widely used. They have, however, the disadvantage that their efficiency of UV light production in the relevant spectral region is only 20%, so that 80% of the introduced energy is dissipative power and must be removed by cooling.

Due to the high power consumption and high dissipative power of the lamps, their surface temperatures are in the range of 800 to 900° C. which necessitates special measures for cooling their surroundings. Since the lamps cannot be immediately restarted after having been switched-off, one must also provide means for preventing the printing ink introduced onto the printed material or the printed material itself from burning when the printing machine is in paused operation. Heat protection glass, which is sometimes cooled, and pivoting reflectors are therefore provided. The power consumption portion of the drying device used in a conventional printing machine having an overall power consumption of 100 kW, assumes values in excess of 50 kW and typically 80 kW.

Conventional use of medium pressure and high pressure lamps is therefore very complicated and expensive and is associated with high power consumption. The associated disadvantages have, however, been accepted in the art of radiation curing printing technology, since one has assumed up to this point in time that very high intensity UV lamps having high UV radiation power were necessary to achieve shorter curing times.

The publication Industrie-Lackier-Betrieb [Industrial Coating and Painting], 1969, pages 85–91 proposes the use of so-called actinic or super-actinic fluorescent lamps to reduce thermal loads when curing UV curable coatings. These are special low pressure lamps having a fluorescent coating which shifts the intensity maximum towards the red to achieve a spectrum having high fractions in the UV-A region. The high UV-A fractions have been considered necessary by those of average skill in the art in order to achieve rapid reaction times. Those skilled in the art of curing pigmented systems such as printing inks were of the same opinion. JP 59189340 A2 (Derwent reference No. 84-303796/49) proposes a compound for use as printing ink which can be cured by a plurality of different UV radiation sources, including high pressure, medium pressure, and low pressure mercury lamps. The applications described in this publication suggest that the lamps primarily emit in the UV-A or visible spectral region and that relatively long irradiation times, not compatible with rapid industrial production processes, were required.

SUMMARY OF THE INVENTION

Departing from this prior art, it is the underlying purpose of the invention to create a process and an associated device for curing a UV curable printing ink on a printed material which avoids the disadvantages of conventional UV gas discharge lamps associated with their high heat production.

In order to achieve this purpose, it is proposed in the above mentioned process and corresponding device to use a low pressure gas discharge lamp as the UV radiation source which has an integrated spectral radiation flux in the UV-B and UV-C region in excess of 50%, preferentially in excess of 75% of the UV radiation flux.

In accordance with the present invention, one has surprisingly discovered that the extremely stringent requirements for radiation curing of printing inks can be satisfied by low pressure gas discharge lamps without—as had been previously considered necessary—having their wavelength spectrum somewhat shifted or substantially shifted towards longer wavelengths.

The range of the UV spectrum as well as its subdivision into various regions are not consistently defined in the literature. Within the framework of the invention, the UV spectrum is subdivided in accordance with DIN 5031, Part 7. It includes the region between 100 and 380 nm, wherein the UV-C range extends from 100 to 280 nm, the UV-B region from 280 to 315 nm and the UV-A region ranges from 315 to 380 nm. Spectral radiation flux refers to the radiation power in watts per nm as a function of wavelength. The radiation flux is a measure of the intensity of the radiation. Integration or summation of the spectral radiation flux over a wavelength interval gives the radiation flux irradiated within this wavelength interval.

Low pressure gas discharge lamps in accordance with the invention are lamps which can normally be operated with gas pressures between 10 mbar and 50 mbar, preferentially between 20 mbar and 30 mbar. Their specific electric power consumption is substantially Less than that of medium and high pressure lamps and lies in the range of 0.2 to 2.5, preferentially between 0.5 and 1.0 watts per cm of arc length. Although the low pressure gas discharge lamp efficiency for the relevant UV region is higher than that of conventional lamps and amounts to 30 to 40%, their overall UV radiation flux is substantially less than that of conventional lamps. It assumes values of circa 0.2 watts per centimeter of arc length and is therefore about a factor of 100 less than that of previously used conventional medium and high pressure lamps.

It has surprisingly turned out that UV curing printing inks can also be satisfactorily cured using low pressure gas discharge lamps even when the printing ink is irradiated with a UV intensity of radiation between 1 and 100 $mW/cm^2$, preferentially between 10 and 50 $mW/cm^2$. The UV intensity of radiation of medium and high pressure lamps on the printed material is approximately 1 $W/cm^2$. This radiation intensity on the printed material refers to the radiation flux per unit area incident on the printed material. The printed material can be tilted at an angle with respect to the direction of the radiation. The intensity of radiation has the units of $W/cm^2$.

The use of low pressure gas discharge lamps in accordance with the invention has various significant advantages in practical applications. Their surface temperature is substantially lower. Mercury vapor lamps have temperatures during normal and optimized operation of about 30° C. Amalgam lamps, which have the advantage compared to mercury discharge lamps of having a somewhat higher UV light yield, have temperatures during normal operation of circa 120° C. These lower surface temperatures, in combination with the reduced power consumption, lead to a substantially reduced temperature loading of the surroundings of the lamp and of the printed material.

The reduced heating oSf the counterpressure cylinder also has technical advantages, in particular for multicolor printing devices. Up to this point in time a high degree of complication and expense was necessary to keep the counter-pressure cylinder at a constant temperature. This was of central importance for the quality and execution of the printing process. The reduced temperature loading allows for the printing of materials with UV curable printing ink which could not previously be printed. An example is temperature-sensitive plastic foils (e.g. heat shrinking foils).

The relatively low power requirements of low pressure gas discharge lamps and the technical simplicity of associated cooling allows for the reduction of the fraction of power consumption for the drying unit: in a printing machine having an overall power consumption of 100 kW, to about 10 to 15 kW or less. The power consumption of a medium pressure gas discharge lamp with associated cooling fan assumes a typical value of about 3.5 kW. In contrast thereto, the power consumption of 10 low pressure gas discharge lamps in accordance with the invention, including associated fans, is only approximately 400 W.

In addition to the reduced heat load, the reduced danger of burning, and the reduced power loss, the low pressure gas discharge lamps have the added advantage of being quickly exchangeable. The lamps require nearly no cooling-down time following failure and can therefore be more rapidly replaced. Furthermore, low pressure gas discharge lamps have the additional advantage compared to conventional lamps of requiring little or no warm-up time before reaching stable operating conditions. They can also be restarted immediately after being switched-off and have an intensity which can be regulated. In addition, in contrast to medium pressure lamps, there is no danger that drops of ink or dirt particles burn into the bulb to destroy the lamp. The lifetime of low pressure gas discharge lamps is about 8000 hours, which is at least four times that of medium pressure lamps.

In addition, the amount of ozone produced through operation of low pressure gas discharge lamps is substantially less than that of medium pressure lamps This is due to the fact that low pressure gas discharge lamps emit little or no radiation at the critical wavelength of 185 nm at which ozone is produced in atmospheric oxygen. In contrast thereto, medium pressure lamps cause substantial ozone production.

In summary, the invention achieves goals which have been sought by those of average skill in the art for a long time. The following measures are preferentially used individually or in combination to assure particularly good results with regard to quality and speed of the configuration as well as with regard to the structural requirements of the printing machine.

It can be advantageous when the integrated UV-B spectral radiation flux is in excess of 50%, preferentially more than 75% of the UV radiation flux. In this case, the lamps are designated UV-B lamps. It can also be advantageous if the UV-C integrated spectral radiation flux is in excess of 50%, preferentially more than 75% of the UV radiation flux. In this case, the lamps are designated UV-C lamps.

Within the framework of the invention, both UV-C as well as UV-B low pressure gas discharge lamps have turned out to be advantageous for the curing process. With UV-C low pressure gas discharge lamps, the radiation flux integrated over the UV-C range can assume values in excess of 50%, preferentially more than 75% of the UV radiation flux. In the case of a UV-B low pressure gas discharge lamp, the corresponding UV-B integrated spectral radiation flux can assume values in excess of 50%, preferentially more than 75% of the UV radiation flux.

The maximum of the spectral radiation flux distribution of the low pressure gas discharge lamps, in particular of the UV radiation flux, can advantageously lie in the UV-B or UV-C region. For a line spectrum, this refers to the wavelength having the highest UV intensity. For a continuous spectrum, this requirement refers to the maximum of the spectral radiation distribution. When the UV spectrum has both lines and continue, this feature refers to the maximum with regard to the line and continuous emission regions.

An additional advantageous feature proposes use of a low pressure gas discharge lamp having an integral spectral UV radiation flux above a wavelength of 190 nm, in particular above 240 nm, which is more than 50%, preferentially more than 75% of its UV radiation flux, in particular of its UV-C radiation flux. It is particularly pin advantageous when the integrated UV-C radiation flux I above a wavelength of 190 nm, in particular above 240 nm, is more than 50% and preferentially more than 75% of the UV radiation flux.

It is particularly advantageous when the low pressure gas discharge lamp emits more than 50%, preferentially more than 75% of the radiation flux of its UV light in the UV-C region above a wavelength of 240 nm. The lamp then differs substantially from the medium pressure lamps having their main emitted UV spectral fraction in the UV-B or UV-A region. Since not only the overall intensity but also the distribution of the individual lines can be of significance, it is advantageous when the above mentioned conditions apply to wavelengths having an intensity of more than 20% of the UV wavelength of highest intensity. The intensity maximum of UV-C low pressure gas discharge lamps is normally in the wavelength range between 249 and 259 nm, in particular at 254 nm.

The likewise advantageous UV-B low pressure gas discharge lamps are also designated as UV-B fluorescent lamps. They have a phosphor coating which shifts the maximum of the radiation flux into the UV-B region. The maximum preferentially lies above 305 nm. The actual positions of the intensity maximum and of the emitted lines as well as, in particular, their linewidths can be influenced by the phosphor or the phosphor mixture. The possible band widths thereby range from very narrow, nearly monochromatic UV-B radiation up to emissions which nearly span the entire UV-B range. The UV-B low pressure gas discharge lamps advantageously emit in excess of 50%, preferentially more than 75% of their UV light in the UV-B region.

Within the framework of the invention, low pressure gas discharge lamps are generally preferred whose emission spectra are not shifted towards longer wavelengths through the addition of fluorescent materials. This means that neither an actinic nor a super-actinic gas discharge lamp is used. The UV-B lamps are not quite as advantageous as the UV-C lamps, since their light output is lower due to the light conversion step and since the printing ink can be less reactive in the spectral region in which they emit than in the UV-C region They nevertheless likewise constitute an economically interesting improvement over conventional medium pressure and high pressure lamps.

In accordance with an additional advantageous feature, a plurality of low pressure gas discharge lamps of differing emission spectra can be utilized, in particular a combination of a UV-C and a UV-B low pressure gas discharge lamp.

The advantageous use of low pressure gas discharge lamps having differing emission spectra to produce mixed light can be effected not only by having differing lamps, but also using lamps which are partially coated with fluorescent material. The ratio of integrated UV-B to integrated UV-C radiation flux can lie between 0:1 and 1:0. A higher UV-C fraction is however normally preferred for the above mentioned reasons.

The fixing agents of conventional UV cured printing inks are normally tuned to the particular radiation of the UV radiation source. One would therefore expect that conventional printing inks are not suitable for the invention and that special fixing agent systems or, in particular, special photo-initiators would be necessary which are tuned to the UV spectrum of the low pressure gas discharge lamps used in accordance with the invention. It is clearly possible for one of average skill in the art to develop printing ink compositions and photo-initiators which are optimized and specially tuned to low pressure gas discharge lamps. It has however surprisingly been discovered within the framework of the invention that good curing results can also be achieved using conventional printing inks. This is particularly true for e.g. the XKC-Series UV-Flex inks of Gebruder Schmidt Druckfarben, Frankfurt, in particular of type 80 XKC 1004-1.

A printing ink is, by way of example, suitable for the process in accordance with the invention which has a fixing agent system containing the following components: a) one or a plurality of cycloaliphatic epoxy resins as curable fixing agent and b) one or a plurality of arylsulfonium salts as photo-initiators. A cycloaliphatic epoxy resin is a cationic curable fixing agent. Clearly, the ink can also contain additional conventional components such as additional photo-initiators, solvents, pigments, dyes, thinning agents, reactive thinner, wax, leveling agent, wetting agents or other additives.

In accordance with an additional advantageous feature, component b) contains a triarylsulfonium salt. It is thereby preferred when the triarylsulfonium salt contains a triarylsulfoniumantimonate, in particular a triarylsulfonium-hexaflouroantimonate. One can advantageously further provide that the component b) contains a mixture of different arylsulfonium salts. The printing ink can also contain other fixing agents in addition to the cycloaliphatic epoxy resin.

Printing technology primarily uses radical curable printing inks, since these provide, when irradiated with conventional medium pressure lamps, a drying time which is shorter than that of a cationic curable printing ink. The radical curable inks have the additional advantage that their chemical composition can be widely varied. However, the most prevalent fixing agents absorb mostly in the UV-C range. As a result, only a small amount of printing ink reactivity can be effected even with photo-initiators absorbing in the UV-C region. In contrast thereto, the fixing agents used with cationic curable printing inks are substantially transparent in the UV-C region. A high degree of reactivity can therefore be achieved even with a UV-C or UV-B low pressure gas discharge lamp. Cationic curable inks based on epoxy resins are preferred within the context of the invention for the above mentioned reasons. Radical curable inks can however also be used.

It is generally advantageous to cure a printing ink with the printing process in accordance with the invention which has fixing agent components which are substantially transparent in the UV-C or UV-B regions of the UV-light from the low pressure gas discharge lamp. In this manner, deeper layers can also be reached by adequate amounts of UV light. This means that the absorption curve of the fixing agent should be shifted towards shorter wavelengths compared to standard fixing agents used in medium and high pressure lamps. Offset printing is associated with typical layer thickness of 1 to 3 $\mu$m and flexographic printing with layer thickness between 3 and 8 $\mu$m. In addition, the squeezed edges have a thickness of at most 20 $\mu$m. The fixing agent should therefore be sufficiently transparent up to a thickness of 20 $\mu$m. This implies that the transparency of the fixing agent is preferentially sufficiently high up to this layer thickness that it does not absorb more than half of the incident UV intensity of the low pressure gas discharge lamp. Accordingly the system of fixing agent and photo initiator is such that preferentially more than 10% of the UV light is absorbed up to a layer thickness of 20 $\mu$m.

The properties of the fixing agent, in particular its transparency to the UV light used and the reactivity of the fixing agent and photo-initiator system are of particular importance for the use of a printing ink within the context of the invention. In addition, as is usual, the individual components should be mixable and mutually compatible so that no spontaneous reactions are triggered. Filling agents and additives can be used in liquid or solid form and are subject to the same requirements with regard to UV light transparency as is the fixing agent.

The pigments can be organic or inorganic in nature. Inorganic compounds are generally solids and organic compounds can be solid or liquid. The concentrations and absorption properties of liquid pigments should be appropriately adjusted This is also true for solid pigments with which additional grain-size dependent scattering effects can occur.

The printing ink should be sufficiently reactive to the UV light and capable of activation by same. This is particularly true for the photo-initiators which should be sufficiently reactive in the wavelength range used. The reactivity has two aspects. First of all, the UV light absorption must be sufficiently large. In addition, the photo-initiators should also properly transfer or feed the absorbed energy into the corresponding radicals (radical polymerization) or acids (cationic polymerization) to initiate the chain reaction for polymerization. The photo-initiator should therefore be present in suitable concentrations and be sufficiently absorbing. It must also be capable of transferring the absorbed UV light energy to the monomers for both radical as well as catioric curing.

It is also possible to use a plurality of photo-initiators in one printing ink having different absorption properties. The chain reaction initiators then differ from the light absorption activators.

It is generally advantageous to cure a printing ink having fixing agents largely transparent to the UV light emitted by the low pressure gas discharge lamp with photo-initiator components which highly absorb the UV light emitted by the low pressure gas discharge lamp, which are reactive and which can also be activated in this wavelength region. It is therefore generally advantageous for the fixing agent and photo-initiator components of the printing ink to be composed and adapted to each other in such a manner that the printing ink can be cured up to a layer thickness of 20 $\mu$m using the UV light emitted by the low pressure gas discharge lamp.

It is furthermore preferred when the printing ink has a high reactivity even at room temperature. In the process in accordance with the invention, the printing ink is heated only slightly or not at all. The temperature during UV curing is preferentially not higher than 40° C. conventional high and medium pressure lamps have substantially higher temperatures and associated application related disadvantages.

In accordance with an advantageous feature, the time duration of the UV irradiation curing of the printing ink is less than 2 seconds, preferentially less than 1 second. The short printing ink reaction time advantageously allows for the realization of high production speeds or smaller separations between the individual printing stations. The reaction time is thereby that time which passes until the surface of the printing ink is no longer sticky so that the printed material can be printed in additional printing stations or otherwise processed The curing time can be substantially longer. With radical curing printing inks, the curing time is not substantially longer than the react-in time. For cationic curing printing inks, the UV irradiation normally only initiates the process, i.e. pre-cures. Subsequent complete curing can be rapid or could also take up to 24 hours. As mentioned, the short irradiation time or reaction time is not only of significance for the printing of an increased number of objects per unit time, rather also in multicolor printing. The passer problem associated therewith necessitates small separations between printing stations and associated rapid intermediate drying to prevent spreading of ink.

The amount of time during which the printing ink is irradiated with UV light depends on the speed with which the printed material and associated printing ink move relative to the low pressure gas discharge lamps for UV curing as well as on the area irradiated by the low pressure gas discharge lamps. With the method in accordance with the invention, printing processes can be advantageously carried out with which the printed material moves with a path velocity of more than 20 m/min., of preferentially more than 40 m/min., and particularly preferably of more than 50 m/min.

The use of low pressure gas discharge lamps in accordance with the invention, in particular in combination with the above described UV curing printing inks, has turned out to be particularly advantageous in Llexographic printing. This is true for all flexographic printing machine concepts which can be classified as follows:

1. The multi-cylinder printing machine is a rotating type having four or six individual printing devices associated with one station, in particular for printing a plurality of colors.
2. The tandem printing machine is a rotating type with each printing device disposed in its own individual station.
3. The one cylinder or central cylinder machine is a rotating type having the printing device disposed about one common central counter-pressure cylinder.

The device in accordance with the invention for curing a UV curing printing ink on a printed material by means of which the printing ink is irradiated with UV light from a UV light source, in particular for carrying out a process in accordance with the invention, is characterized in that the UV radiation source comprises a low pressure gas discharge lamp whose integrated UV-B and UV-C spectral radiation flux is in excess of 50%, preferentially more than 75% of the UV radiation flux. A device of this kind is subsequently designated with the conventional name “drier”.

Depending on the application, the drier can include one or more UV radiation sources. If a plurality of UV radiation sources are used, these could be the same or of differing types. It can also be advantageous in certain special cases to provide for conventional radiation sources in addition to the low pressure gas discharge lamp. The exclusive use of low pressure gas discharge lamps is preferred. An advantageous feature proposes that a drier comprises more than four, preferentially more than eight, low pressure gas discharge lamps.

An advantageous embodiment can be particularly characterized by the fact that the drier comprises a plurality of adjacently disposed low pressure gas discharge lamps. In this fashion, a high UV radiation intensity per unit area on the printed material or a smoother spatial illumination can be effected. Alternatively, a relatively large area can thereby be illuminated. The low pressure gas discharge lamps can be bar-shaped. However, it is preferred when the drier comprises a plurality of U-shaped low pressure gas discharge lamps disposed next to each other at the longitudinal sides of the U-shape. U-shaped low pressure gas discharge lamps have the advantage of effecting a relatively high illumination intensity. The low pressure gas discharge lamps can be arranged in particularly close proximity to another if they are disposed in alternately opposite directions. The open and closed ends of the U-shape form an alternating series and the open ends having electrical contacts can be connected to electrical contact elements without having the separation between the low pressure gas discharge lamps be limited by these contact elements.

The separation between the lamps and between the lamps and the printed material is preferentially subject to the requirement that the radiation intensity in the plane of the printed material within the principal effective region, i.e. excluding e.g. the entrance and exit zones, is as homogeneous as possible. If the printed object is moved along a transport direction and/or rotated in the curing zone, this condition applies to the time integrated intensity during passage through the drier.

The low pressure gas discharge lamps can be disposed at close relative separations to effect a compact assembly and/or to realize a homogenous irradiation intensity which deviates by less than 30%, preferentially by less than 20% from an average value. The low pressure gas discharge lamp bulbs can even touch without mutual separation. The separation between the builks of he low pressure gas discharge lamps preferentially does not exceed 30%, preferentially not more than 20% of the low pressure gas discharge lamp bulb diameter.

The separation between the low pressure gas discharge lamps and the printed object should be sufficiently large to prevent contact with the lamp in case that the position of the printed object should be subject to variations. A reasonable practical minimal separation is 1 cm. The upper limit of the separation between the surfaces of the low pressure gas discharge lamps and the printed material can advantageously be less than 5 cm.

It is furthermore preferred when the device comprises a reflector for reflecting the UV light emitted by the low pressure gas discharge lamps onto the curing printing ink. The reflector can be used to reflect UV light for UV curing which is not emitted by the low pressure gas discharge lamps in a direction towards the printed material as well as to effect a more even illumination of the printed material. If the printed materials are extended, the reflector is preferentially disposed on that side of the low pressure gas discharge lamps which faces away from the printed material to reflect the UV light emitted by the low pressure gas discharge lamps in a direction towards the printed material. If the printed material is not an extended flat object, it can also be advantageous to dispose a reflector at that side of the printed material facing away from the irradiation source to more evenly illuminate the printed material at all sides.

Reflectors disposed at that side of the low pressure gas discharge lamps facing away from the printed material are also known in the art for use with medium and high pressure lamps. They normally comprise metal plates and can be pivoted to reduce the heat load on the printed material during pauses in the operation of the installation. A reflector in accordance with the invention can, in contrast thereto, preferentially be stationary. The heat loading of the printed material caused by the low pressure gas discharge lamps is not severe. Since the lamps can be immediately restarted, they can also be switched-off if necessary. The reflector is therefore less complicated and less expensive.

The reflecting layer of the reflector can be assembled from planar portions. In a preferred configuration which is particularly easy to manufacture, the reflector comprises one single planar reflecting layer. If the reflector is also stationary, the configuration is particularly simple to realize.

Improved optics can be achieved in other advantageous configurations in which the reflecting layer of the reflector has concave portions curved with respect to the low pressure gas discharge lamp. In addition, the reflector can be arranged in a conventional manner at a separation from the low pressure gas discharge lamp. The reduced surface temperature of the low pressure gas discharge lamps also allows for the reflector to be in line or surface contact with the low pressure gas discharge lamp. In this manner, a very compact construction of the drier is effect,ted which nevertheless has increased light output. Surface contact can advantageously occur over 30% to 60% of the surface of the bulb or of the periphery of a cross section through the low pressure gas discharge lamp respectively. The optimal values for each case depend on the size of the printed object and its separation from the low pressure gas discharge lamp.

It can be advantageous when the reflector comprises a dielectric mirrored layer to achieve a high degree of reflection. A dielectric mirrored layer is a multi-layered system of optical coatings for increasing the amount of reflection. The reflector itself can thereby be fashioned from metal, glass or another suitable material.

The reflector is preferentially diffuse reflecting in order to achieve a more even spatial irradiation intensity on the printed material and i.e. comprises a reflecting layer made from optically diffuse reflecting material. Optically diffuse reflecting materials are materials which, due to their composition, diffusely reflect incident optical radiation or diffusely pass penetrating radiation. They can therefore be designated as Lambert surfaces or Lambert radiators. They are usually mat white.

The optically diffuse reflecting material can be made from conventional ceramic plate or from metallic reflectors having a roughened, metallic reflecting surface (e.g. aluminum plates). A coating can be used comprising, in particular, a transparent material containing diffuse reflecting particles such as barium sulfate, titanium oxide or magnesium oxide.

A particularly advantageous feature proposes that the optically diffuse reflecting material of the reflector reflecting layer comprises a matrix made from a transparent matrix material consisting essentially of a curable silicone rubber with imbedded reflecting particles. A material of this kind is optically, chemically, biologically, and thermally resistant, is insensitive to soiling and can also be easily cleaned. It has a good resistance to aging and has high transparency, in particular to UV.

The matrix material in accordance with the invention consists essentially of silicone rubber. By essentially is meant that the silicone rubber does not contain any amount of foreign materials which would be intolerable for obtaining the desired properties, so that the properties of the matrix material are determined by the silicone rubber. As a rule, the matrix material normally consists of silicone rubber having a standard commercial or preferentially higher purity of e.g. in excess of 95%.

In principle, all conventional silicone rubber is usable within the framework of the invention. A suitable silicone rubber material can be selected which has the necessary matrix material properties in dependence on the application. Both condensation cross-linked as well as addition cross-linked rubber may be used.

Silicone rubbers can be advantageously poured to facilitate inexpensive creation of arbitrary shapes for various applications. Other economical production processes, such as extrusion, are advantageous and possible. The thin liquid curable silicone rubber is initially processed and vulcanization subsequently occurs to form a cured, solid matrix material. For most applications, it is advantageous when the Shore A hardness of the cured matrix material assumes values in accordance with the DIN standard 53505 of between 20 and 90. The matrix material has an advantageous intrinsic solidity in this range.

In accordance with an advantageous feature, the reflecting particles are present within the matrix material in powdered form. For most applications, he reflecting particles should be homogeneously imbedded in the matrix material. For special applications, it can however be advantageous for the concentration of reflecting particles in the matrix material to increase or decrease with depth.

All conventional diffuse reflecting substances are suitable for use as diffuse reflecting particles in accordance with the invention. Examples of such diffuse reflecting substances are magnesium oxide, aluminum oxide, titanium dioxide, polytetrafluoroethylene (Teflon (B) or silicon dioxide (Aerosil (R). Barium sulfate has turned out to be particularly advantageous within the context of the invention.

The diffuse reflecting particles substantially include one or more of the above mentioned substances. By substantially is meant that other particles are not present in the material or are only present to such an extent that, for the actual application, the diffuse reflection properties are determined by the particles to satisfy the particular requirements in each case. The particles are normally contained within the matrix material as pure substances having a high commercially producible purity, e.g. in excess of 99%. A high purity and homogeneous distribution can be particularly advantageous in optics applications. The particles of each substance can have one grain size or comprise a mixture of differing grain sizes to achieve special spectral properties.

The reflecting particles in the material in accordance with the invention can comprise only one of the above mentioned substances or can be a mixture of two or more differing substances. For production related technical reasons, an admixture of particles of only one substance is preferred In special applications, in particular for effecting a specific spectral dependence, it can however be advantageous to utilize a mixture of differing substances and/or a mixture of differing grain sizes.

The grain size of the above mentioned particles advantageously lies substantially between 1 $\mu$m and 100 $\mu$m: for the case of silicon dioxide (Aerosil®, between 10 nm and 200 nm. Substantially thereby means that the average value of the grain size distribution lies in this range. Since the grain size of particles or of powder has a certain tolerance or grain size distribution in dependence on production processes, a small amount e.g. up to 5% of the particles can also be present which lie outside of the above mentioned size range.

The full width half maximum of the actual grain size distribution can be critical in certain applications and rather insignificant for other applications. Trial and error can determine which particle sizes and particle size distributions produce the desired reflection properties for the actual case at hand.

The material in accordance with the invention has the advantage of having a wide range of applicability. It can be easily manufactured and tailored mechanically and optically to the case at hand. It can be self-supporting and of nearly arbitrary shape or be securely disposed on a substrate, wherein it can level and cover unevenness in the substrate. It is optically, thermally and biologically stable and temperature-insensitive. It can be easily cleaned and absorbs little light. The actual properties can be optimized for the particular application requirements. In addition, it is easily and therefore inexpensively processed. The hardness can be adjusted within a wide range to facilitate many differing applications. For example, flexible mats of suitable stability can be produced e.g. by molding which have arbitrary curved and bent shapes. The material can be easily worked and mechanically processed. It can be solid or flexible and can also be glued. Shaped objects can be molded or produced by injection molding. The material has no intrinsic color and therefore does not disadvantageously influence the spectrum. The surface of the reflecting material facing the emitted light must not have the mat finish required with conventional materials. It must not have a "molecular roughness" in order to effect good diffuse reflection performance. For this reason, it can be molded in a mold having a smooth surface.

The material in accordance with the invention is preferentially produced by mixing of the particles into a liquid matrix material under vacuum. In this manner, a vulcanized material can be produced without bubbles.

Further advantageous features and highlights can be recognized by means of the following embodiments of the invention and are described in further detail below with reference to the schematic representation of the drawings.

DETAILED DESCRIPTION OF THE INVENTION

Figure 1:
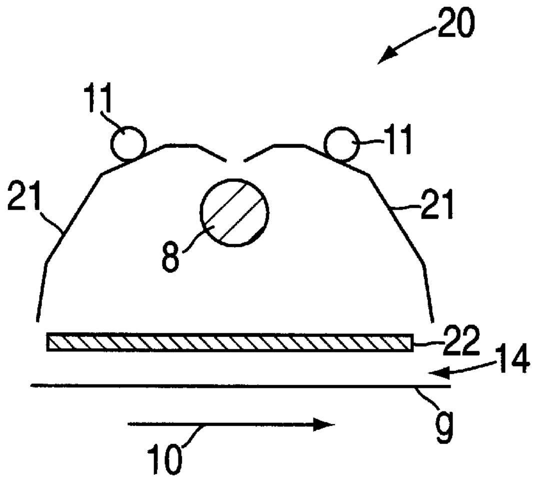
FIG. 1 shows a schematic cross section through a drier according to prior art in an operating state.
Figure 2:
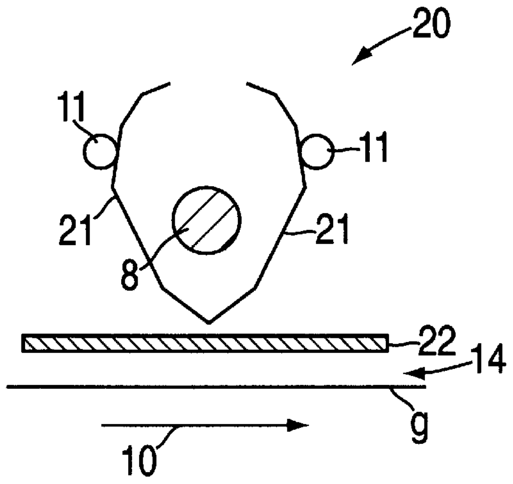
FIG. 2 shows a schematic cross section through a drier according to prior art in a paused condition.

FIG. 1 shows a schematic cross section through a drier 20 according to prior art in its operating state, with curing printed material 9 which has been printed with UW curing printing ink 14 passing thereby. A medium pressure gas discharge lamp, UV radiation source 8, produces UV light to trigger polymerization of the printing ink 14. The printed material 9 is fed past the UV radiation source 8 in transport direction 10. Pivoting reflectors 21 are provided for smoothing out the illumination intensity on the printing ink 14 and for increasing the light yield. They can each be pivoted via a turning device 11 from the operating condition shown in FIG. 1 into the paused position shown in FIG. 2. The reflectors 21 must be pivoted, since the medium pressure lamp has a very high surface temperature and would burn the printed material 9 when it is stationary relative to the lamp 8.

Figure 3:
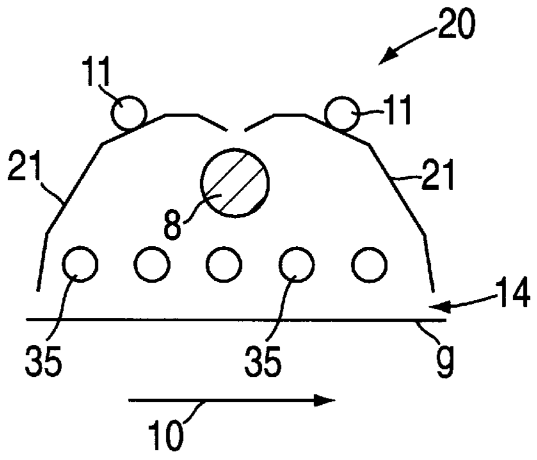
FIG. 3 shows a modification of FIG. 1.
Figure 4:
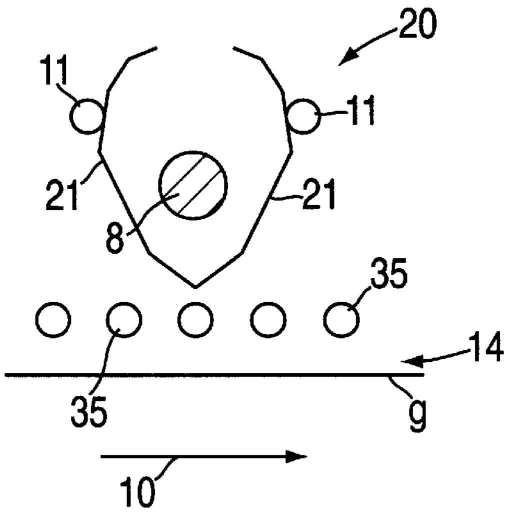
FIG. 4 shows a modification of FIG. 2.

Heat protection glass 22 is disposed between the UV radiation source 8 and the printed material 9 to protect the printed material 9 and the printing ink 14 from the high amount of heat emanating from the medium pressure lamp. FIGS. 3 and 4 are modifications of FIGS. 1 and 2 having cooling pipes 35 flown through by water instead of the heat protection glass 22 to remove the heat.

Figure 5:
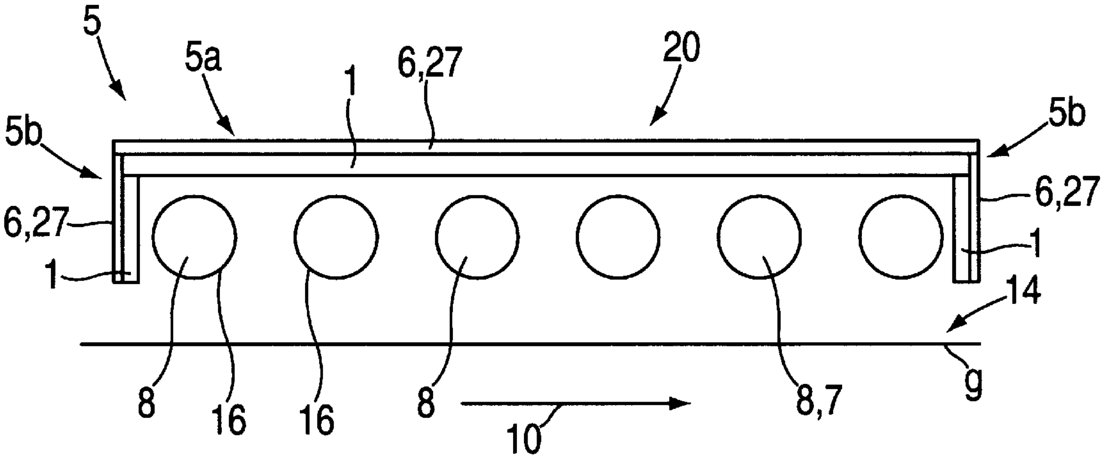
FIG. 5 shows a schematic cross section through a first drier in accordance with the invention.

FIG. 5 shows a schematic cross section through a drier 20 in accordance with the invention. In this case, the UV radiation sources 8 comprise a plurality of mutually adjacent low pressure gas discharge lamps 7 which are passed by the printed material 9, printed with printing ink 14, which is fed in transport direction 10 to cure the printing ink 14. Advantageous low pressure gas discharge lamps are, in particular, the UV-C lamps of type TUV produced by Philips having a principal emission at 254 nm and the UV-B lamps of type TL/01 with principal emission at 311 to 312 nm or of type TL/12 having principal emission at 306 nm. They have a high efficiency for UV light and can be operated with nearly no ozone production. The low heat output of the low pressure gas discharge lamps permits the reflector 5 to be stationary and at a small separation from the lamps. The separation between the reflector 5 and the UV radiation sources 8 can be less than twice the diameter, preferentially less than one time the diameter, of the bulb 16 of the UV radiation sources 8.

In the embodiment shown, the reflector 5 comprises three planar reflectors 5. One large reflector **5*a* is disposed on that side of the lamps 8 facing away from the printed material 9. Two smaller reflectors 5*b* are disposed at the sides. The reflectors comprise a reflecting layer made from a reflecting material 1. The reflecting material 1** can e.g. be a conventional ceramic plate or metallic reflector. The metallic reflector can have a roughened, metallic reflecting surface and be made e.g. from aluminum.

It is preferred when the reflecting layer of the reflector 5 consists essentially of an optically diffuse reflects material in accordance with the invention having a matrix material made from cured silicone rubber with a homogeneous distribution of particles imbedded therein.

These particles comprise powdered barium sulfate having a grain size of about 50 $\mu$m. The particles are not visible in FIG. 5 due to their small size. The ratio of particles to matrix material is approximately 1:10 by weight. A ratio smaller than 1:100 does not normally result in sufficiently high reflectivity. weight ratios in excess of 1:1 normally result in a degree of filling of the matrix material by the particles which is so high that the silicone becomes brittle or does not properly vulcanize.

The reflector 5 has a reflectivity in excess of 90%. The reflecting layer of material 1 has a thickness of several millimeters. It may advantageously lie in the range between 0.1 and 10 mm. The reflector 5 can therefore be a so-called volume reflector. Such a reflector differs from a purely surface reflector in that reflection also occurs from deeper material layers.

The reflecting material 1 or the reflecting sheet metal is disposed on a substrate 6 or on a portion of the housing 27. The matrix material 2 or the reflecting material 1 can be a condensation cross-linked silicone rubber directly bound to the supporting surface and can, for example, be extruded onto the substrate 6. if the matrix material is an additive cross-linked rubber, a suitable bonding process, e.g. gluing, can be used to bind it to the supporting surface.

Advantageous silicone rubbers are in particular those sold by the company Wacker-Chemie GmbH [Wacker Chemical Incorporated], Munich under the name "Elastosil®", in particular the types M 4600, R 401, R 402, R 411, R 420, R 4000, and R 4105 as well as Semicosil, inl particular the types 911, 912, and types RTV-E 604, RTV-ME 601, and SilGel 612.

Figure 6:
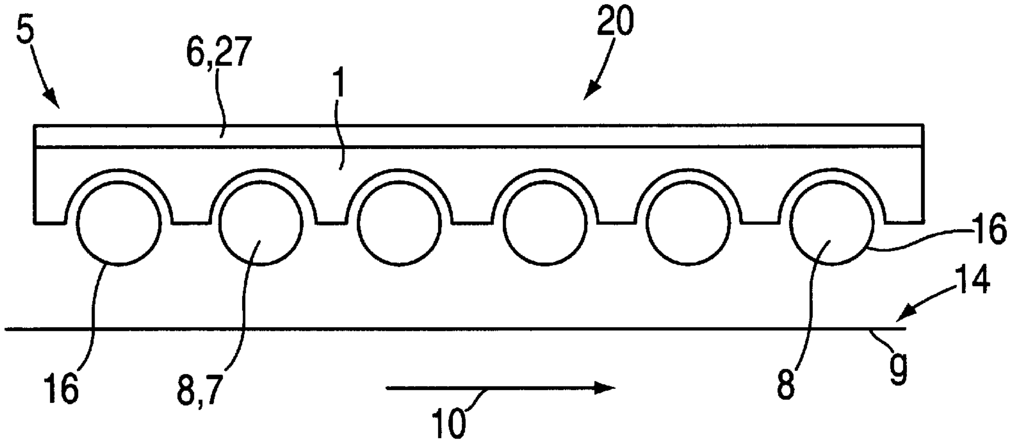
FIG. 6 shows a first modification of FIG. 5.

FIG. 6 shows a modified reflector 5. The reflecting material 1 layer consists essentially of a matrix material in accordance with the invention made from silicone rubber having diffuse reflecting particles. It is mounted to a substrate 6 or to a housing portion 27.

The reflecting layer is characterized in that its surface facing the radiation sources 8 has curved concave portions with respect to the radiation sources. They are disposed at a small separation from the surface of the bulb 16 of the corresponding UV radiation source 8. This separation can be less than one half of the diameter of the UV radiation source 8 bulb 16. Towards this end, the center of each curve of the reflector 5 can lie inside the associated low pressure gas discharge lamp, in particular at its center. In this manner a compact configuration can be realized which provides for a homogeneous illumination of the printed object 9. For certain applications, it can be advantageous if the reflecting layer of diffuse reflecting material 1 is immediately adjacent to the bulb 16 of the UV radiation sources 8. This is possible, in particular, with low pressure mercury gas discharge lamps.

Figure 7:
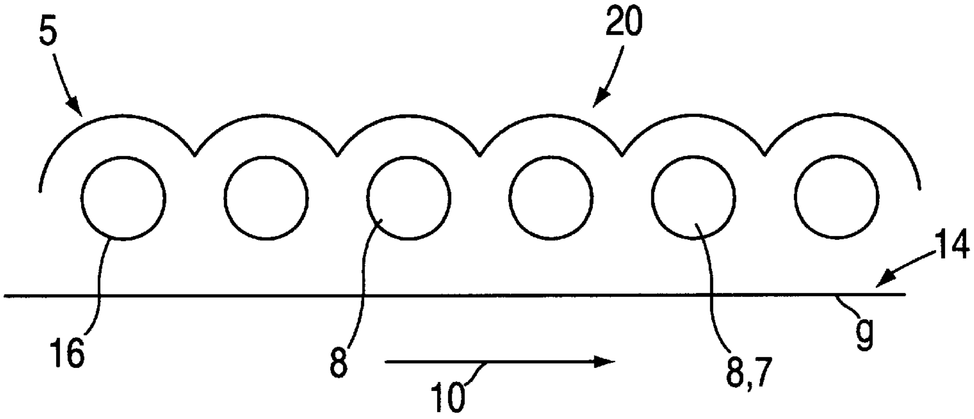
FIG. 7 shows a second modification of FIG. 5.

FIG. 7 shows a schematic cross section through a drier 20. This drier 20 differs from the driers in accordance with FIGS. 5 and 6 in that the reflector 5 consists essentially of one or more sheet metal reflectors which are not flat but curved in a concave manner with respect to the UV radiation sources 8. The reflectors 5 can also be stationary and an be disposed at a small separation from the low pressure gas discharge lamps due to their low heat production.

Figure 8:
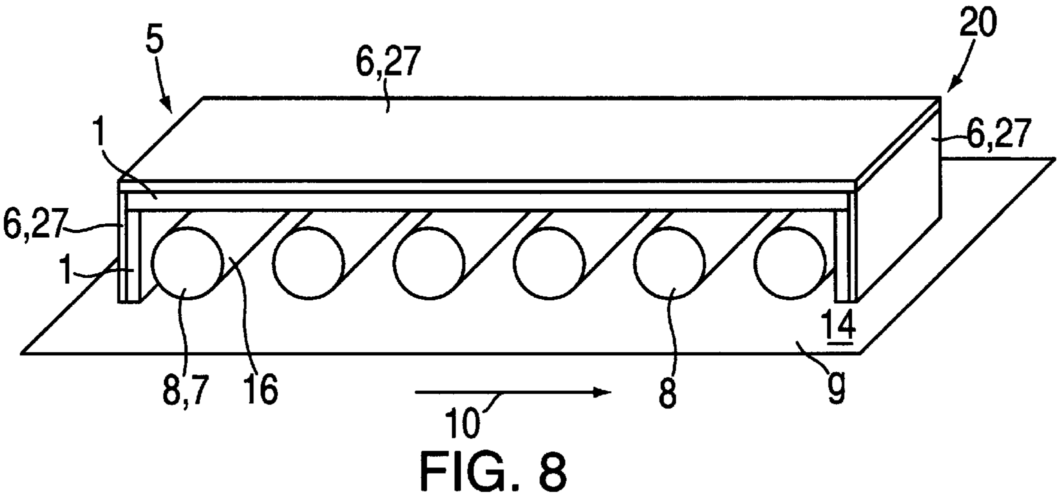
FIG. 8 shows a perspective view of FIG. 5.
Figure 9:
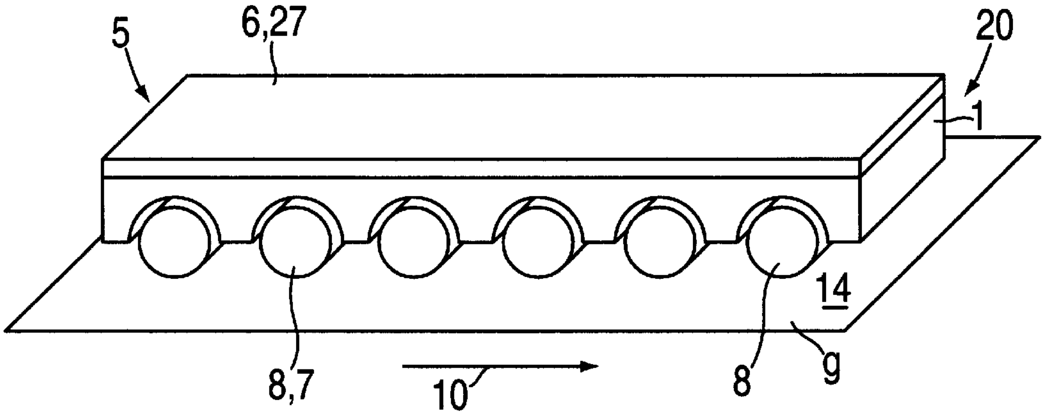
FIG. 9 shows a perspective view of FIG. 6.
Figure 10:
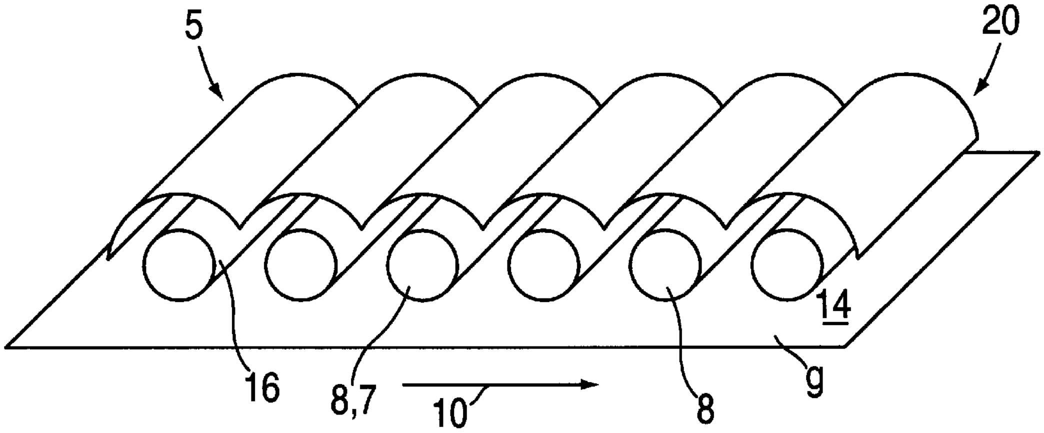
FIG. 10 shows a perspective view of FIG. 7.

Perspective views are shown in FIGS. 8 through 10. FIG. 8 corresponds to FIG. 5, FIG. 9 to FIG. 6, and FIG. 10 to FIG. 7. In all the figures, construction elements such as electrical leads, cooling devices and mechanical supports are not shown for reasons of clarity.

Figure 11:
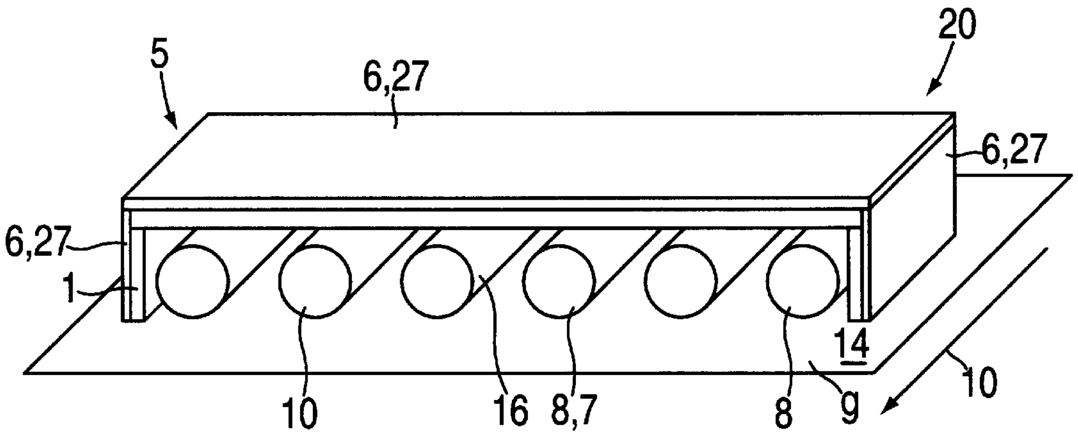
FIG. 11 shows a modification of FIG. 8.
Figure 12:
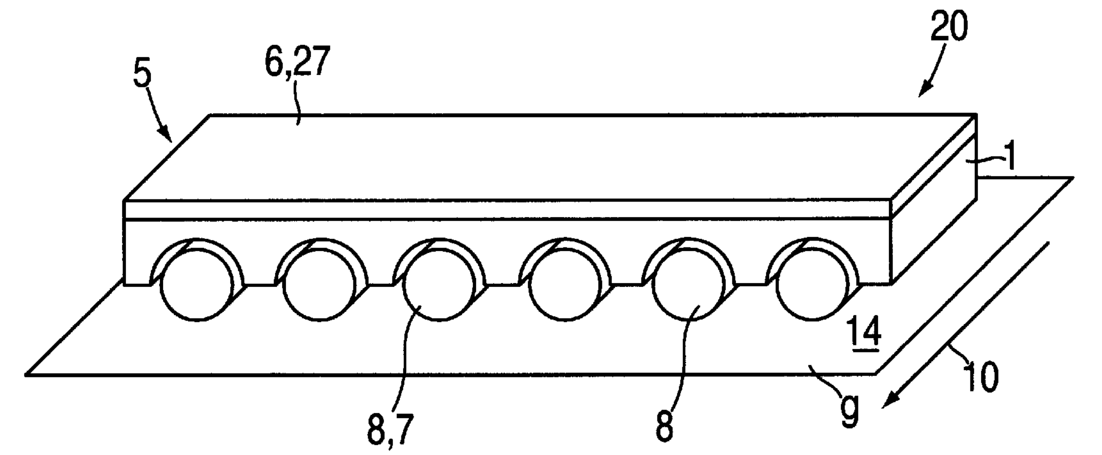
FIG. 12 shows a modification of FIG. 9.
Figure 13:
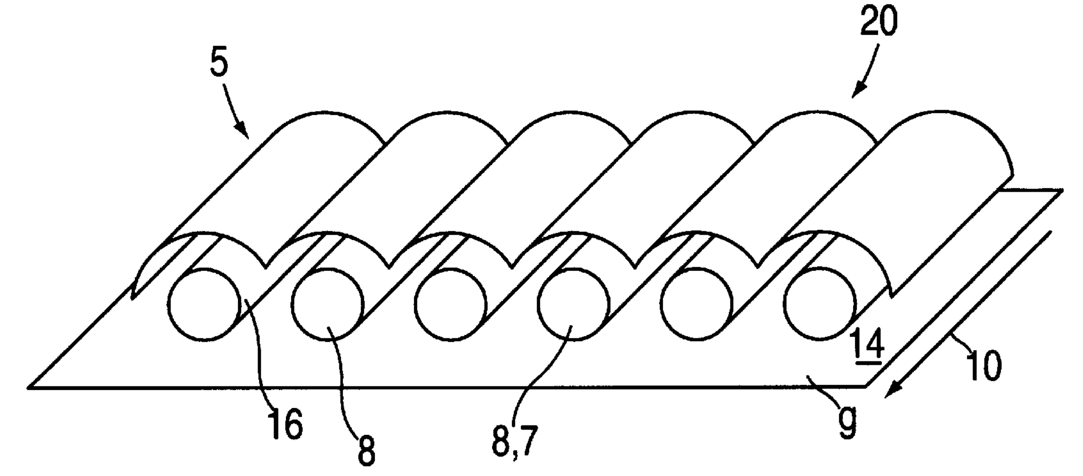
FIG. 13 shows a modification of FIG. 10.

FIGS. 11 through 13 show modifications of FIGS. 8 through 10 which differ with regard to the transport direction 10 of the printed material 9. In FIGS. 8 through 10, the printed material 9 is transported at right angles to the axial direction of the UV radiation sources 8. With the driers 20 in accordance with FIGS. 11 through 13, transport occurs in the axial direction of the UV radiation sources 8. In principle, the transport direction 10 can assume any arbitrary angle with respect to the axes of the low pressure gas discharge lamps. The transport directions 10 shown are preferred for optimizing use of the emitted UV light and to achieve an illumination time which is evenly distributed on the printed material 9.

Figure 14:
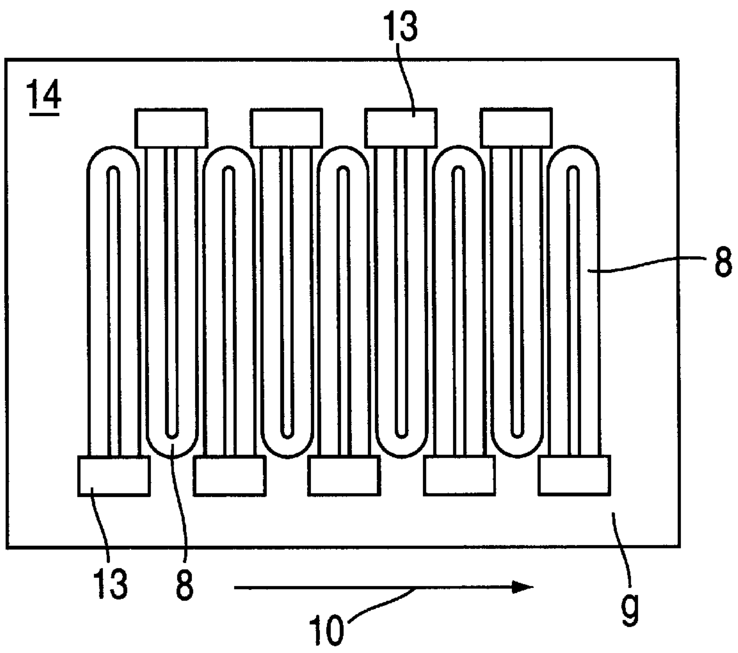
FIG. 14 shows a schematic view of a plurality of lamps.
Figure 15:
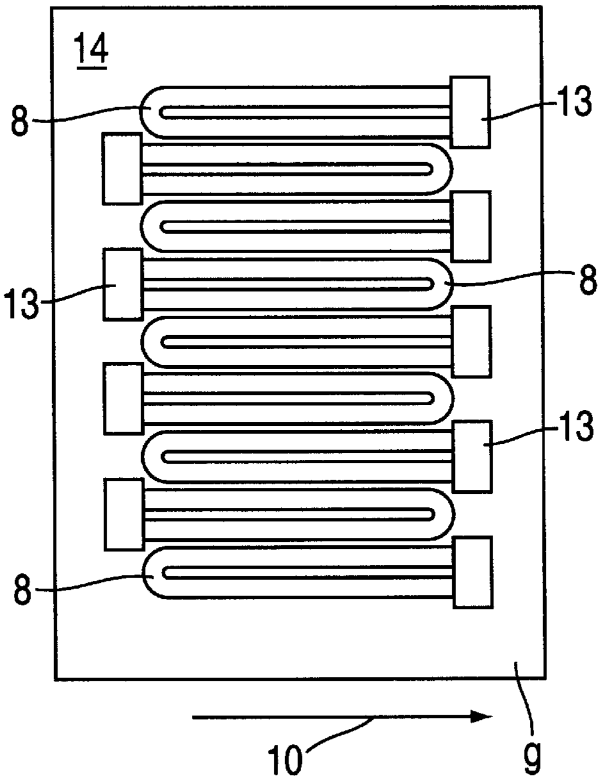
FIG. 15 shows a modification of FIG. 14.

FIGS. 14 and 15 show schematic views of a plurality of UV radiation sources 8 configured as U-shaped low pressure gas discharge lamps 7. In the embodiment shown, a total of nine lamps are disposed with mutually adjacent lengthwise sides for even illumination of the drying surface of the printed material 9. In addition, the lamps are alternately oppositely directed to effect as compact an assembly as possible with high illumination intensity. The electrical connection elements 13 therefore form an alternating series with the closed ends of the U-shaped lamps at both sides of the arrangement. There is a sufficient amount of space between each of the electrical connection elements 13 such that the separation between the lamps is not limited by the electrical connection elements 13. FIGS. 14 and 15 differ with regard to the transport direction 10 of the printed material 9 whose drying surface, having the UV printing ink 14 which is to be cured, passes by the lamps. The reflectors are not shown in FIGS. 14 and 15.

Figure 16:
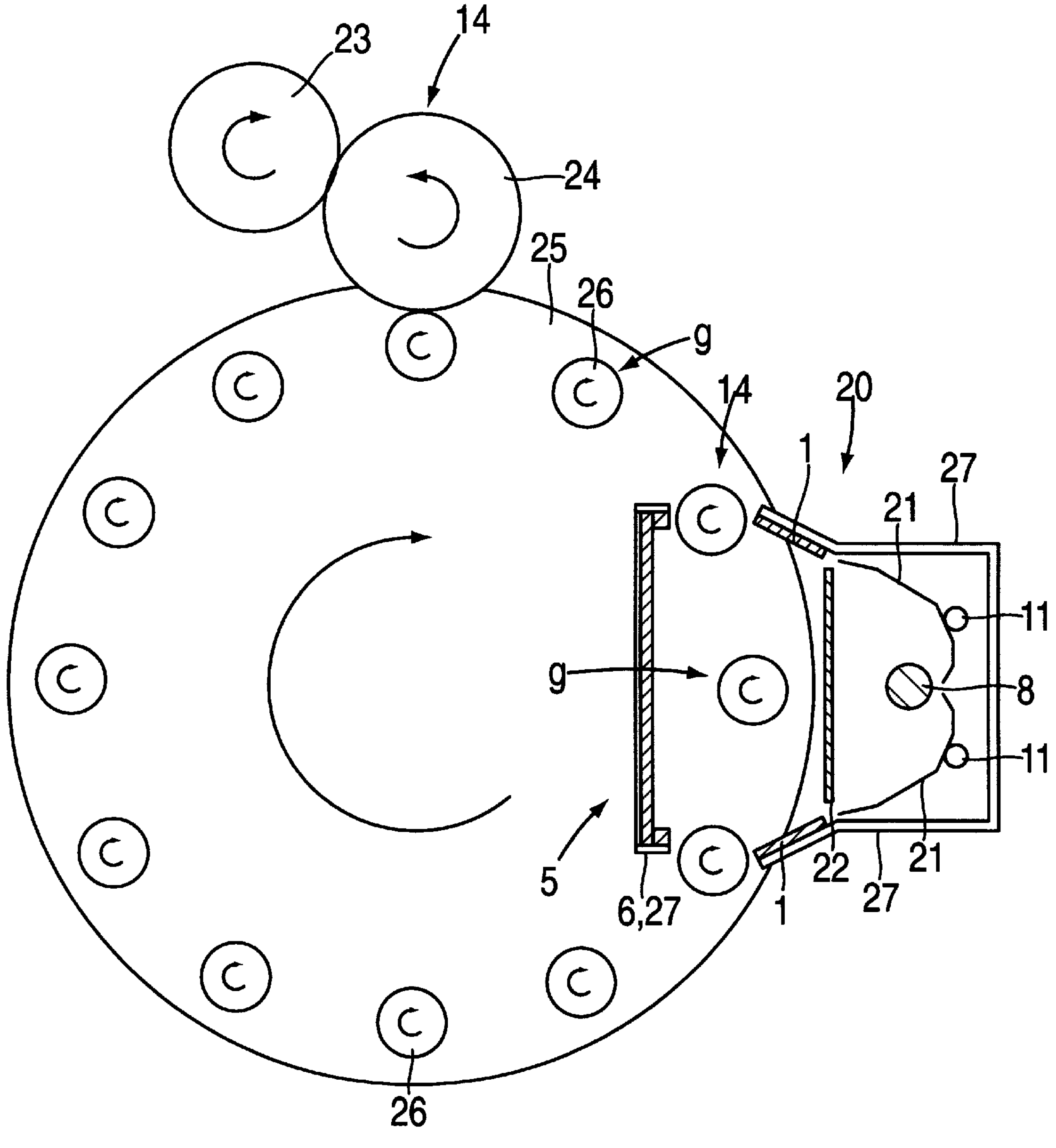
FIG. 16 shows a schematic cross section through a drier and a printing machine.

FIG. 16 shows a schematic cross section through a drier 20 and a printing machine. Its UV radiation source 8 comprises a conventional high pressure gas discharge lamp emitting in the UV region. In addition to the lamps, the housing 27 also contains pivoting reflectors 21 for directing the light onto the printed material 9. When the installation comes to rest, these reflectors 21 can be pivoted to protect the printed material 9 from overheating. A heat protection glass 22 is also provided for, since the conventional JV illumination sources 8 generate a large amount of heat. In accordance with the invention, one or more low pressure gas discharge lamps should therefore be used as UV radiation source 8. The pivoting reflector 21 can then be a stationary reflector in the manner mentioned above and the heat protection glass 22 can be eliminated. In this manner, the drier 20 can be of compact construction and evenly illuminate the printed material 9. The heat load is also substantially reduced.

In the example shown, the printed material 9 are tubes or cups disposed on rotating tube arbors 26 of a tube plate 25. The UV curing printing ink 14 is introduced from a wiping blade chamber or a color chamber (not shown) to the printing apparatus with its associated raster roller 23 and block roller 24. The block roller 24 transfers the pattern onto the tubes. The rotating tube plate 25 guides the tubes through the curing zone of the drier 20 to effect curing via UV irradiation. After leaving the curing zone, the tubes are removed from the tube arbors 26 and the tube arbors 26 are provided with fresh non printed tubes. The associated mounting and removal devices are not shown.

In order to achieve a homogeneous illumination of the printed material 9 within the curing zone as well as a high light yield, the curing zone is surrounded with optically diffuse reflecting material 1 in accordance with the invention. The reflecting material 1 can be introduced onto special substrates 6 or disposed on the housing 27. The evenness of the illumination and the light yield can be improved, in particular, by use of reflectors 5 disposed on the side of the printed material 9 facing away from the illumination source 8. If the heat produced by the illumination source 8 is not excessively high, the pivoting reflectors 21 can also be provided with material 1 in accordance with the invention. A stationary reflector in accordance with the invention can alternatively be disposed on the side of the illumination source 8 facing away from the printed material 8.

Figure 17:
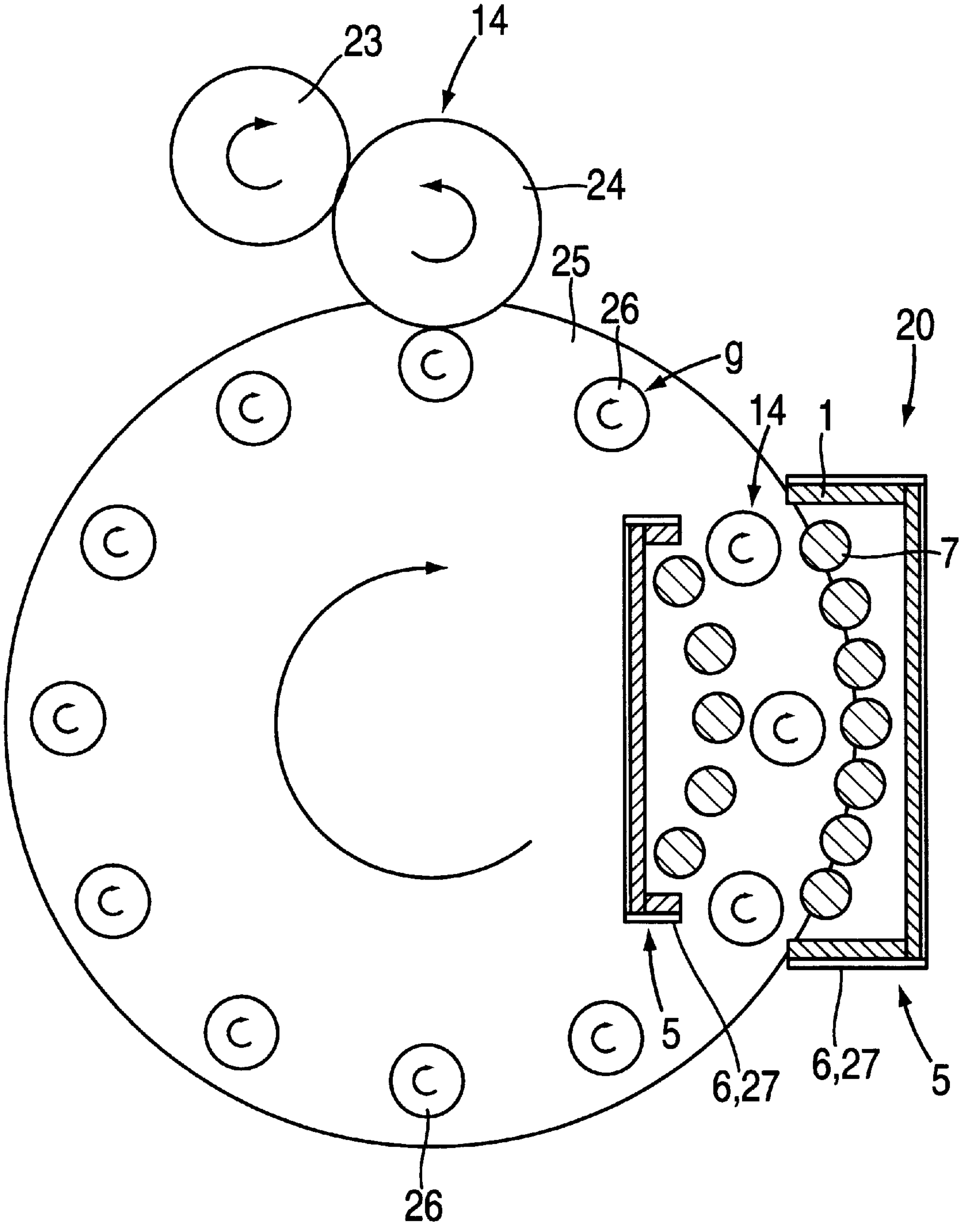
FIG. 17 shows a schematic cross section through a drier in accordance with the invention.
Figure 18:
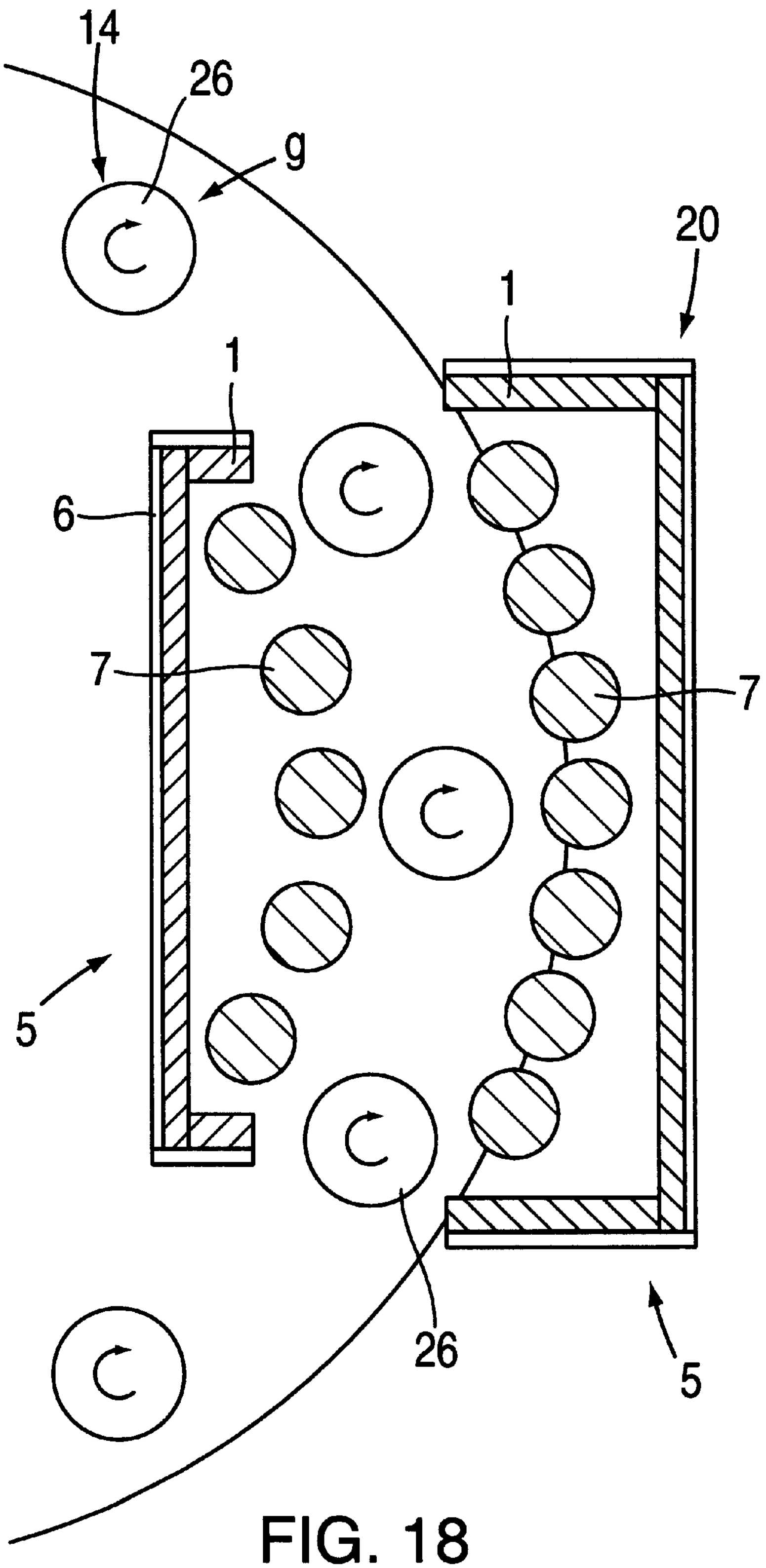
FIG. 18 shows a detail of FIG. 17.

FIG. 17 shows the drier of FIG. 16 in an embodiment in accordance with the invention having low pressure gas discharge lamps 7. The printed material 9 are tubes or cups disposed on rotating tube arbors 26 of a tube plate 25. They are transported through the drier 20 at a path speed of circa 50 m/min. In addition to this motion along a path, the tube arbors 26 also rotate. The drier 20 comprises a housing 27 in which the reflecting material 1 is disposed on substrates 6 for effecting a homogeneous illumination of the printed material in the curing zone. The reflector 5 provides for homogeneous illumination in combination with the 12 low pressure gas discharge lamps 7. The low pressure gas discharge lamps 7 are disposed at close proximity to another and the printed material 9 is fed past and in close proximity to the low pressure gas discharge lamps 7. Neither an expensive and difficult cooling mechanism nor a heat protection glass are needed due to the low heat production of the low pressure gas discharge lamps 7. The reflector 5 is stationary and does not comprise any pivoting components. FIG. 18 shows a detail of FIG. 17.

Figure 19:
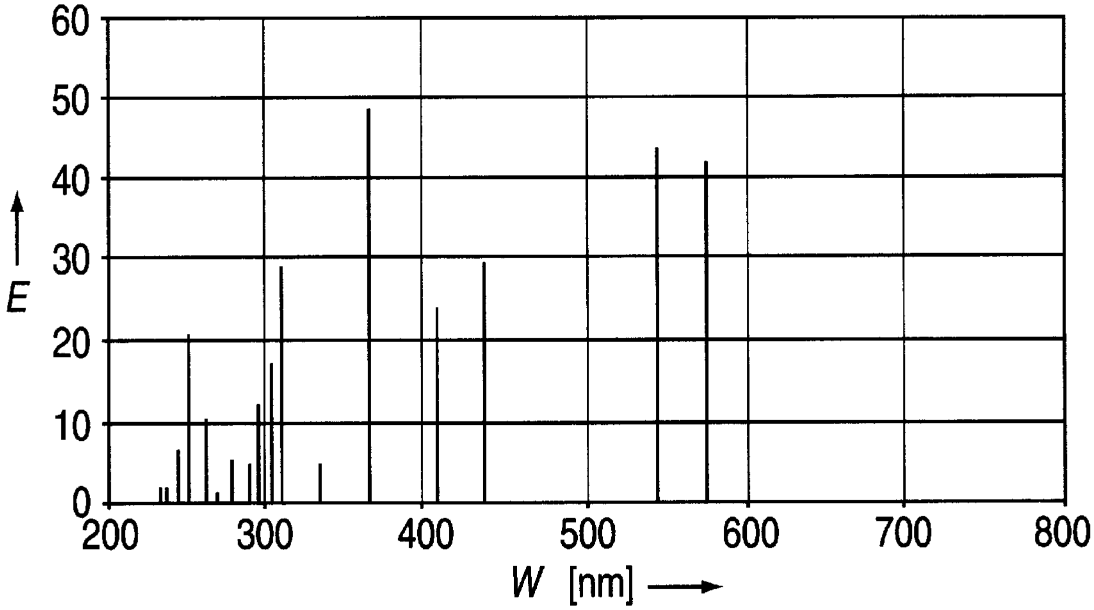
FIG. 19 shows a relative spectral radiation flux of a high pressure mercury vapor lamp.
Figure 20:
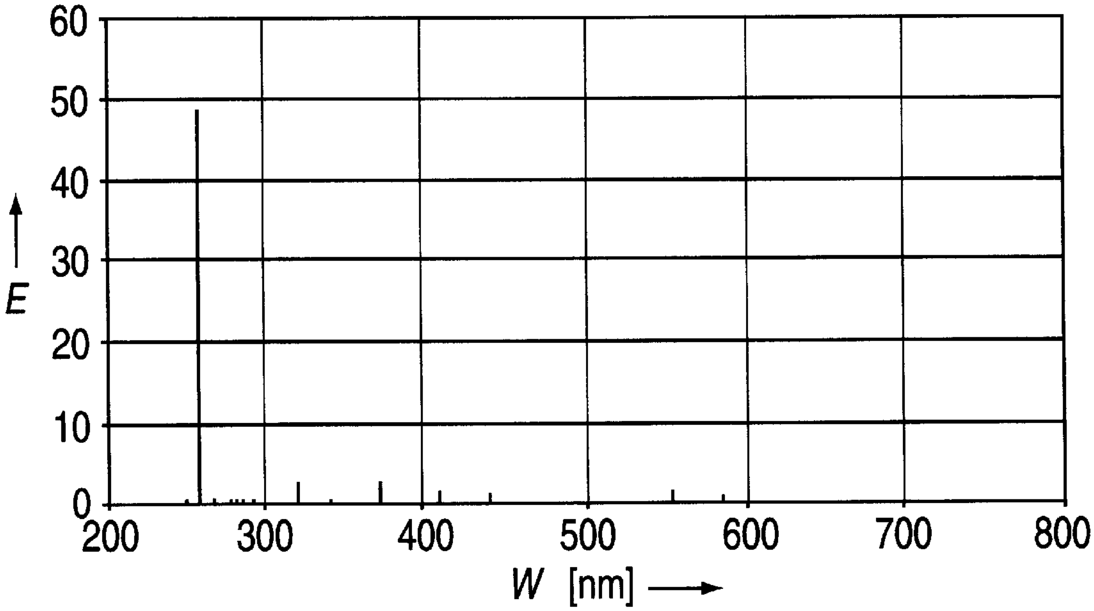
FIG. 20 shows a relative spectral radiation flux of a low pressure gas discharge mercury vapor lamp.
Figure 21:
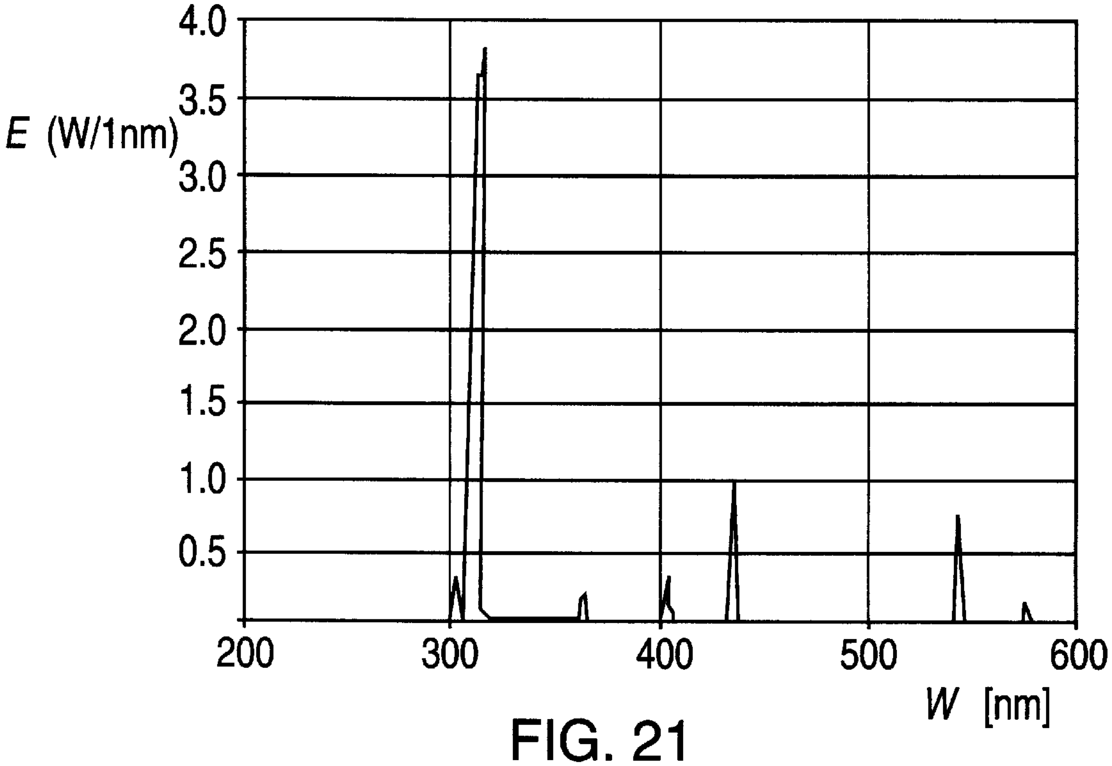
FIG. 21 shows a spectral radiation flux of a UV-B low pressure gas discharge lamp.

FIGS. 19, 20, and 21 show typical relative spectral radiation fluxes of mercury gas lamps. FIGS. 19 and 20 each show the spectral radiation flux E in arbitrary units as a function of wavelength w and, in FIG. 21, in absolute units as a function of wavelength w. FIG. 19 shows the spectrum of a high pressure lamp and FIG. 20 that of a low pressure UV-C lamp. It can be seen that, the UV-C low pressure gas discharge lamp emits primarily in the UV-C region, whereas the main emission region of the high pressure lamp is at longer wavelengths.

The UV-C low pressure gas discharge lamp of FIG. 20 is a low pressure lamp which does not have any added fluorescent material, e.g. it is a nonactinic low pressure lamp. FIG. 21 shows the spectrum of a UV-B low pressure gas discharge lamp. This is a fluorescent material lamp whose principal emissions are displaced into the region near 305 nm through the addition of fluorescent material. Further intensities also appear in the UV-A and visible region.

What is claimed is:

1. A process for curing a UV curing printing ink applied on a printed material, comprising the steps of: irradiating a printing ink with UV light from a UV radiation source by using a low pressure gas discharge lamp having a spectral radiation flux integrated over a UV-B region of a UV spectrum of more than 50% of a UV radiation flux, and an integrated UV radiation intensity is between 1 and 100 $mW/cm^2$.

2. The process according to claim 1, wherein an integrated UV-B and UV-C radiation intensity is between 1 and 100 $mW/cm^2$.

3. The process according to claim 1, wherein an integrated UV-B and UV-C radiation intensity is between 10 and 50 $mw/cm^2$.

4. The process of claim 1, wherein an integrated UV radiation flux of the low pressure gas discharge lamp above a wavelength of 190 nm is in excess of 50% of the UV radiation flux.

5. The process of claim 1, wherein an integrated UV-C radiation flux of the low pressure gas discharge lamp above a wavelength of 190 nm is in excess of 50% of the UV-C radiation flux.

6. The process of claim 1, wherein an integrated UV-B and UV-C radiation intensity is between 1 and 100 $mW/cm^2$.

7. The process of claim 1, wherein an integrated UV-B and UV-C radiation intensity is between 10 and 50 $mW/cm^2$.

8. The process of claim 1, wherein an integrated NV-C radiation intensity is between 1 and 100 $mW/cm^2$.

9. The process of claim 1, wherein an integrated UV-C radiation intensity is between 10 and 50 $mW/cm^2$.

10. The process of claim 1, wherein the printing ink is not heated above 40° C. during the UV curing.

11. The process of claim 1, wherein the printing ink is reactive at room temperature.

12. The process of claim 1, wherein a thickness of the printing ink on the printed material is between 1 and 20 $\mu$m.

13. The process of claim 1, wherein the printing ink contains a mixture of differing arylsulfonium salts.

14. A device for curing a UV curable printing ink on a printed material, comprising: a UV radiation source consisting essentially of at least one low pressure gas discharge lamp having a spectral radiation flux integrated over a UV-B region of a UV spectrum of more than 50% of a UV radiation flux, and an integrated UV radiation intensity is between 1 and 100 mW/cm$^2$.

15. The device according to claim 14, wherein the spectral radiation flux integrated over the UV-B region is more than 75% of the UV radiation flux.

16. The device according to claim 14 or 15, wherein an integrated UV-B radiation intensity is between 10 and 50 mW/cm$^2$.

17. The device of claim 14, adapted for irradiation of the printed material in ambient atmospheric conditions with oxygen present.

18. The device of claim 14, wherein the low pressure gas discharge lamp is a mercury vapor lamp having a phosphor coating or an amalgam lamp having a phosphor coating.

19. The device of claim 14, wherein the radiation source does not heat the printed material above 40° C. during irradiation.

20. The device of claim 14, wherein an integrated spectral UV radiation flux, of the low pressure gas discharge lamp above a wavelength of 190 nm, is in excess of 50%, of the UV radiation flux.

21. The device of claim 14, wherein an integrated spectral UC radiation flux, of the low pressure gas discharge lamp above a wavelength of 240 nm, is in excess of 50%, of a UV-C radiation flux.

22. The device of claim 14, wherein the at least one low pressure gas discharge lamp comprises a plurality of said lamps.

23. The device of claim 22, wherein the at least one lamp includes at least one low pressure gas discharge lamp whose emission spectrum differs from that of another low pressure gas discharge lamp of the plurality.

24. The device of claim 14, wherein an electrical power consumption of the low pressure gas discharge lamp is between 0.2 and 2.5 watts per centimeter of arc length.

25. The device of claim 14, wherein a homogeneity of a UV radiation intensity on the printed material in a region effective for curing the printing ink is sufficient such that said radiation intensity deviates from an average value by less than 30%.

26. The device of claim 14, wherein a homogeneity of at least one of a UV-B or a UV-C radiation intensity on the printed material in a region effective for curing the printing ink is sufficient such that at least one of said UV-B radiation intensity or said UV-C radiation intensity deviates from an average value by less than 30%.

27. The device of claim 14, wherein the at least one lamp comprises a plurality of mutually adjacent low pressure gas discharge lamps, wherein a separation between the plurality of low pressure gas discharge lamps does not exceed 30% of a diameter of a low pressure gas discharge lamp bulb.

28. The device of claim 14, wherein the at least one lamp comprises a plurality of low pressure gas discharge lamps having a U-shape and disposed in a planar arrangement in mutual adjacency at a parallel lengthwise sides of the U-shape, wherein the plurality of low pressure gas discharge lamps are disposed in alternating opposite directions.

29. The device of claim 14, wherein a separation between the at least one low pressure gas discharge lamp and the printed material is between 1 cm to 5 cm.

30. The device of claim 14, further comprising a reflector to reflect UV light emitted from the at least one low pressure gas discharge lamp onto the curing printing ink.

31. The device of claim 30, wherein the reflector is stationary.

32. The device of claim 30 or 31, wherein the reflector comprises at least one of a dielectric mirrored layer and a reflecting layer made from an optically diffuse reflecting material acting as a lambertian source.

33. The device of claim 32, wherein the reflector comprises the reflecting layer and the optically diffuse reflecting material comprises a matrix of transparent matrix material comprising a curable silicone rubber in which optically diffuse reflecting particles are imbedded.

* * * * *